(12) United States Patent
Mei et al.

(10) Patent No.: US 7,755,867 B2
(45) Date of Patent: Jul. 13, 2010

(54) CONTROLLED AIR BEARING (CAB) FOR MAGNETIC SPACING CONTROL

(75) Inventors: Youping Mei, Eden Prairie, MN (US); Lance E. Stover, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 835 days.

(21) Appl. No.: 10/195,955

(22) Filed: Jul. 16, 2002

(65) Prior Publication Data

US 2003/0011932 A1 Jan. 16, 2003

Related U.S. Application Data

(60) Provisional application No. 60/305,745, filed on Jul. 16, 2001.

(51) Int. Cl.
*G11B 5/56* (2006.01)
*G11B 21/24* (2006.01)
(52) U.S. Cl. ............... 360/294.7; 360/234.4; 360/235.6
(58) Field of Classification Search .............. 360/235.6, 360/236.4, 294.7, 294.1–294.4, 234.4, 234.5
See application file for complete search history.

(56) References Cited

U.S. PATENT DOCUMENTS

| 4,605,977 | A | * | 8/1986 | Matthews | 360/234.7 |
| 4,669,011 | A | | 5/1987 | Lemke | 360/103 |
| 4,853,810 | A | * | 8/1989 | Pohl et al. | 360/234.7 |
| 5,021,906 | A | * | 6/1991 | Chang et al. | 360/235.1 |
| 5,423,207 | A | | 6/1995 | Flechsig et al. | 73/104 |
| 5,711,063 | A | | 1/1998 | Budde et al. | 29/603.06 |
| 5,729,408 | A | * | 3/1998 | Kikitsu | 360/294.7 |
| 5,896,246 | A | | 4/1999 | Budde et al. | 360/104 |
| 5,898,541 | A | | 4/1999 | Boutaghou et al. | 360/103 |
| 5,943,189 | A | | 8/1999 | Boutaghou et al. | 360/103 |
| 5,991,113 | A | * | 11/1999 | Meyer et al. | 360/75 |
| 6,046,888 | A | | 4/2000 | Krinke et al. | 360/104 |
| 6,115,223 | A | * | 9/2000 | Berg et al. | 360/294.4 |
| 6,265,806 | B1 | | 7/2001 | Suzuki | 310/309 |
| 6,335,850 | B1 | | 1/2002 | Dunfield et al. | 360/294.5 |
| 6,344,949 | B1 | * | 2/2002 | Albrecht et al. | 360/236.5 |
| 6,360,035 | B1 | | 3/2002 | Hurst, Jr. et al. | 385/18 |
| 6,362,542 | B1 | | 3/2002 | Novotny | 310/12 |
| 6,545,846 | B1 | * | 4/2003 | Chee et al. | 360/294.4 |

(Continued)

*Primary Examiner*—Brian E Miller
(74) *Attorney, Agent, or Firm*—Leanne Taveggia Farrell; Westman, Champlin & Kelly, P.A.

(57) ABSTRACT

The present invention relates to a controlled air bearing which allows adjustable control over the magnetic spacing between the pole tips of a slider and the surface of the disc. In accordance with one embodiment of the invention, a slider for use in a data storage system, the slider comprises a base portion having a leading edge end and a trailing edge end. The embodiment further comprises a movable air bearing surface element positioned at the leading edge end of the base portion. Finally, the embodiment further comprises an actuator positioned at the leading edge end of the base portion and coupling the base portion to the movable air bearing surface element, the actuator selectively controllable to move the movable air bearing surface element relative to the base portion to alter an air bearing surface provided by the base portion and the movable air bearing surface element to thereby control a fly height of the slider. The present invention includes a method for implementing the steps performed by the embodiment of the apparatus.

13 Claims, 9 Drawing Sheets

U.S. PATENT DOCUMENTS

| | | | |
|---|---|---|---|
| 6,600,635 B2 * | 7/2003 | Smith | 360/294.7 |
| 6,611,399 B1 * | 8/2003 | Mei et al. | 360/234.7 |
| 6,690,543 B2 * | 2/2004 | Kurita et al. | 360/234.7 |
| 6,775,103 B2 * | 8/2004 | Kang et al. | 360/236.5 |
| 7,068,457 B2 * | 6/2006 | Riddering et al. | 360/75 |
| 7,589,938 B2 * | 9/2009 | Gatzen | 360/294.7 |
| 7,660,080 B1 * | 2/2010 | Liu et al. | 360/294.7 |

* cited by examiner

CONTROLLED AIR BEARING (CAB) FOR MAGNETIC SPACING CONTROL

CROSS-REFERENCE TO RELATED APPLICATION

This application claims priority from U.S. Provisional Application No. 60/305,745 filed on Jul. 16, 2001 for inventors Youping Mei and Lance E. Stover and entitled CONTROLLED AIR BEARING (CAB) FOR MAGNETIC SPACING CONTROL.

FIELD OF THE INVENTION

The present invention relates generally to disc drives, and more particularly but not by limitation to sliders.

BACKGROUND OF THE INVENTION

Disc drives are common data storage devices. A typical disc drive includes a rigid housing or deck that encloses a variety of disc drive components. The components include one or more discs having data surfaces coated with a medium for storage of digital information in a plurality of circular, concentric data tracks. The discs are mounted on a spindle motor that causes the discs to spin and the data surfaces of the discs to pass under respective hydrodynamic or aerodynamic bearing head sliders. The sliders carry transducers, which write information to and read information from the data surfaces of the discs.

In disc drives, magnetic spacing can be defined as the spacing between the transducers and the data surfaces of the discs. In high recording density hard drives, it can be beneficial for the magnetic spacing to be adjustable for the pole tip of a transducer to stay very close to the media without crashing the slider. This adjustment also enables compensation for pole tip thermal expansion.

Proposed approaches to achieving adjustable magnetic spacing include utilizing a shape memory alloy (SMA) on the suspension, utilizing a bimetal gimbal, and electrostatic actuation. The SMA concept places a piece of shape memory alloy on the suspension arm to adjust the preload force as the temperature changes. The bimetal gimbal approach bends the gimbal by heating up one layer of the gimbal such that the pitch angle is adjusted. Both approaches are suitable for low frequency control of the magnetic spacing between the pole tips and the disc, but not for high frequency control because thermal actuation is a relatively slow process. The electrostatic approach adjusts the magnetic spacing by applying potential between the head and the disc to form a capacitor. It has a high probability of crash ("snap over"), but the bandwidth is relatively high compared to SMA and bimetal gimbal approaches. None. of these approaches render an optimum high band width magnetic spacing control.

Embodiments of the present invention address one or more of these and/or other problems, and offer other advantages over the prior art.

SUMMARY OF THE INVENTION

Other features and benefits that characterize embodiments of the present invention will be apparent upon reading the following detailed description and review of the associated drawings.

The present invention relates to a controlled air bearing which allows adjustable control over the magnetic spacing between the pole tips of a slider and the surface of the disc.

In accordance with one embodiment of the invention, a slider for use in a data storage system comprises a base portion having a leading edge end and a trailing edge end. The embodiment further comprises a movable air bearing surface element positioned at the leading edge end of the base portion. Finally, the embodiment further comprises an actuator positioned at the leading edge end of the base portion and coupling the base portion to the movable air bearing surface element. The actuator is selectively controllable to move the movable air bearing surface element relative to the base portion to alter an air bearing surface provided by the base portion and the movable air bearing surface element to thereby control a fly height of the slider and thus the magnetic spacing. The present invention includes a method of manufacturing embodiments of the apparatus.

These and various other features as well as advantages which characterize the present invention will be apparent upon reading the following detailed description and review of the associated drawings.

DETAILED DESCRIPTION OF ILLUSTRATIVE EMBODIMENTS

Figure 1:
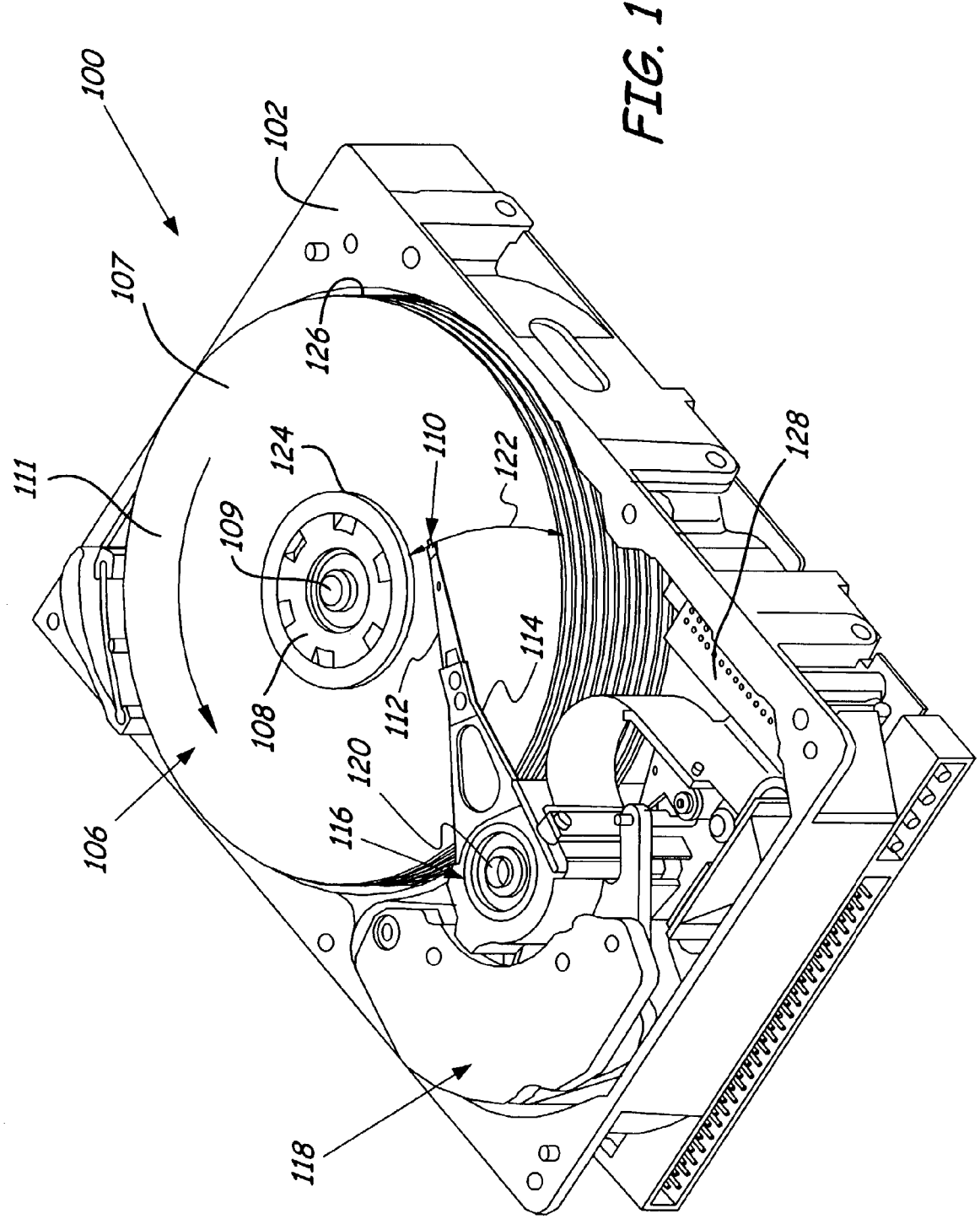
FIG. 1 is an isometric view of a disc drive.

FIG. 1 is an isometric view of a disc drive 100 in which embodiments of the present invention are useful. Disc drive 100 includes a housing with a base 102. Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface 111 has an associated disc head slider 110 which is mounted to disc drive 100 for communication with disc surface 111. In the example shown in FIG. 1, head sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached head sliders 110 about a pivot shaft 120 to position head sliders 110 over a desired data track along an arcuate path 122 between a disc inner diameter 124 and a disc outer diameter 126. Voice coil motor 118 is driven by servo electronics 128 based on signals generated by head sliders 110 and a host computer (not shown). Head sliders 110 include controlled air bearing design features in accordance with the present invention. Disc drive 100 can be a magnetic disc drive, an optical disc drive, a magnetic-optical disc drive, or other type.

Figure 2:
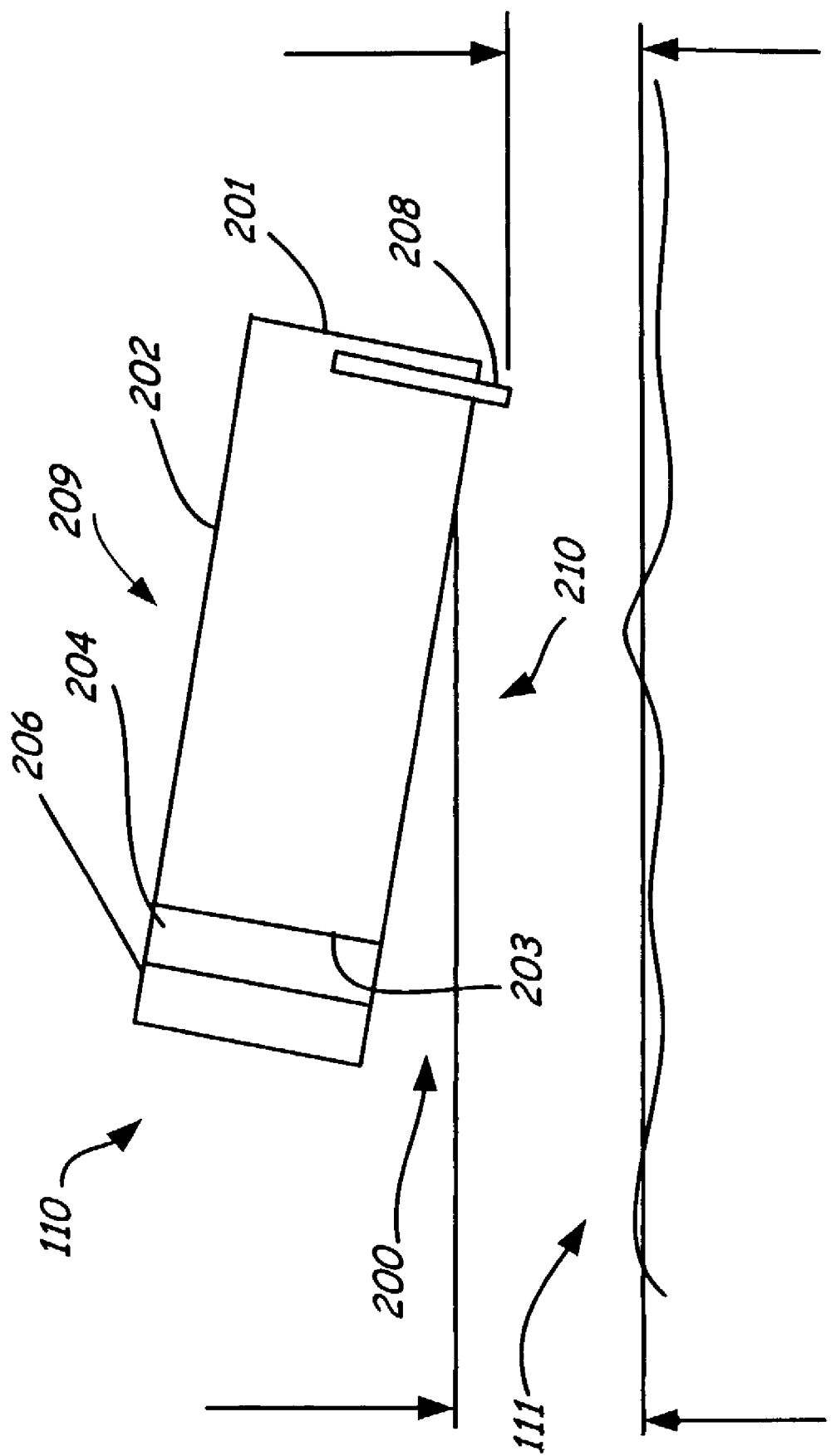
FIG. 2 is a side view of an apparatus embodying features of the present invention.

FIG. 2 is a side view of an apparatus embodying features of the present invention. Shown in FIG. 2 is an embodiment of slider 110 having a controlled or controllable air bearing 200 which allows fly height (and thus magnetic spacing) control. The "Controlled Air Bearing" (CAB) 200 includes three pieces: a base 202, an actuator 204, and a movable air bearing surface element, also called an air flow regulation element, 206. Base 202 is a typical slider body material, such as a ceramic material, and can include transducer layers forming one or more thin film transducers 208 at the trailing edge end 201 of the base. The base also has a leading edge end 203, a top or top surface 209 and a bottom or bottom surface 210. In other embodiments, such as those used in optical disc drives, transducers 208 need not be thin film transducers.

Actuator 204 is coupled to leading edge end 203 of base 202, and may be a thin PZT (Lead Zirconium Titinate) sheet or a MEMS (Micro-electro-mechanical system) or any other actuator fitting the size and performance requirements. In this embodiment of the invention, actuator 204 is a thin PZT sheet. Movable air bearing surface element 206 is positioned at or adjacent leading edge end 203 and is coupled or attached to leading edge end 203 by actuator 204. Movable air bearing surface element 206 may extend from bottom 210 because positions of components relative to each other may be variable based on the state of actuation or other factors. Attachment may be done using a glue, spiron glass, or another technique. Movable air bearing surface element 206 is actuated by applying voltage across actuator 204. Methods for actuating a PZT sheet are well known in the art. This is a high bandwidth approach, suitable for use in disc drives.

Figure 3:
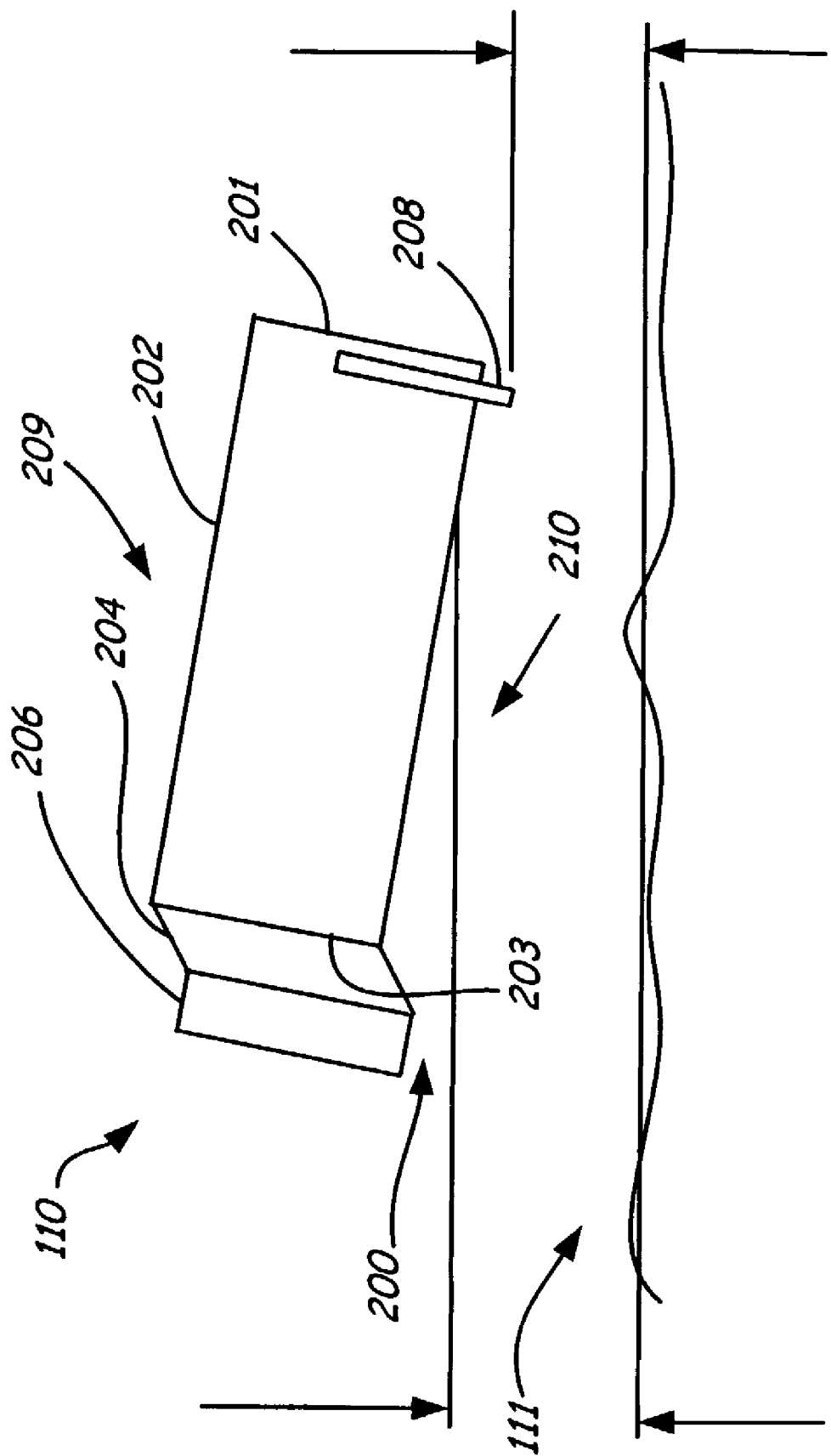
FIG. 3 is a side view of an apparatus embodying features of the present invention being actuated.

FIG. 3 shows slider 110 of FIG. 2 in operation. FIG. 3 illustrates an embodiment of the invention where movable air bearing surface element 206 has been extended, by actuator 204, below base 202 to control fly height (and thus magnetic spacing) of slider 110. When movable air bearing surface element 206 is moved up or down by actuator 204, the air bearing surface provided by these elements is adjusted and therefore the air pressure underneath is changed such that the overall pressure distribution is altered, thereby changing the magnetic spacing between slider 110 and disc surface 111 of disc 107.

This approach offers at least three advantages over other designs relating to fabrication or operation. First, the piece of ceramic material, base 202, with transducer 208 attached is fairly thick so that it is easy to backgrind during the fabrication process. Second, it is not critical to make the surface of movable air bearing surface element 206 and that of transducer 208 coplanar. Consequently, the bar lapping manufacturing step is less complex. Third, actuation and fly height need not be decoupled. In fact, actuation and fly height need to be coupled so that the magnetic spacing can be adjusted by actuation of movable air bearing surface element 206 (via actuator 204).

The CAB approach disclosed herein operates under several assumptions. Specifically, air bearing designs needed to take advantage of this approach must be sensitive to actuation. In addition, it is often desirable to have a simple mathematical relationship, such as a linear relationship, between the actuation of element 206 (via actuator 204) and the fly height change. As in most spacing control methods, a reliable sensing mechanism aids in optimal use of the invention.

Figure 4:
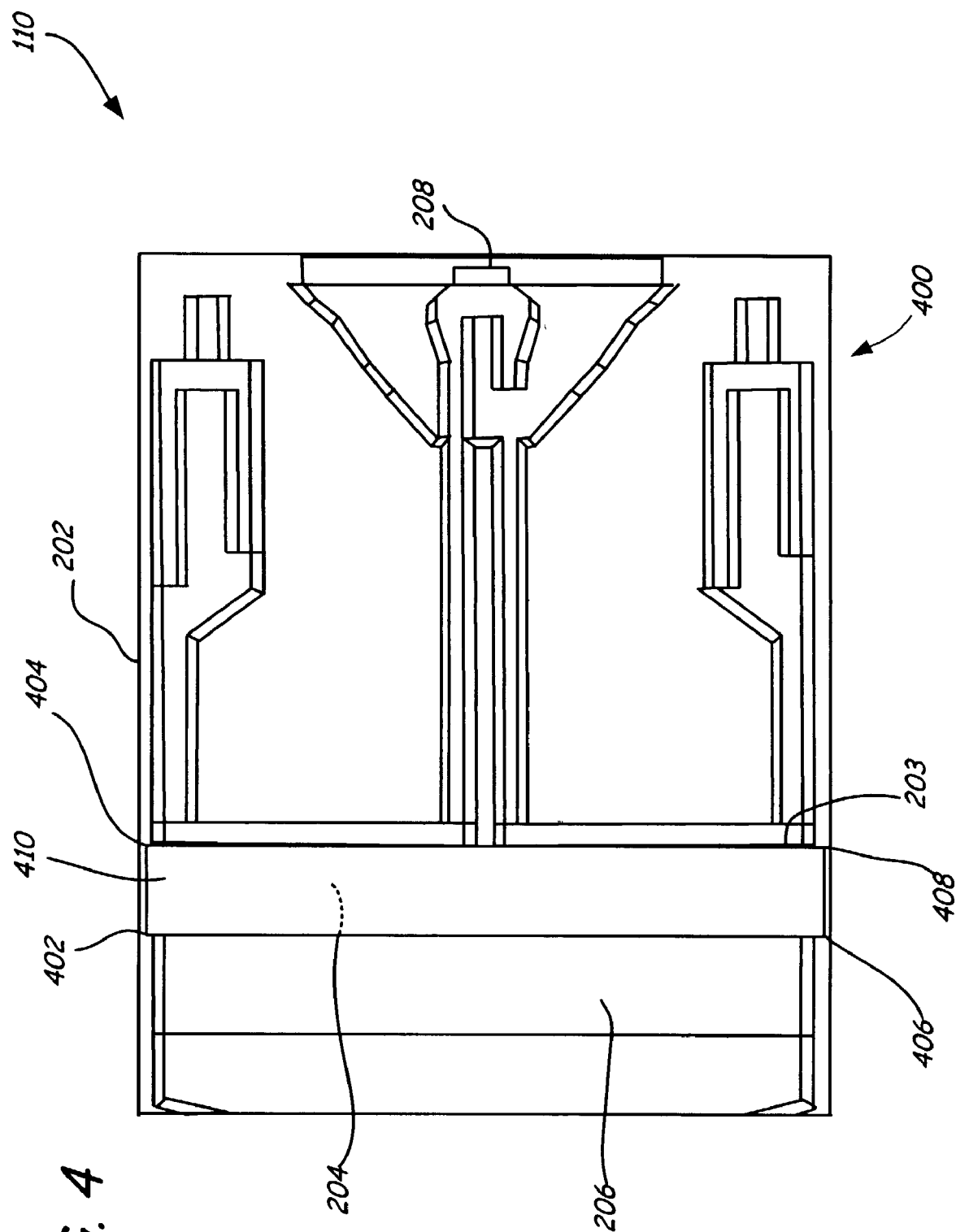
FIG. 4 is a bottom view of an apparatus embodying features of the present invention.

FIG. 4 is a bottom view of an apparatus embodying features of the present invention, a modification based on a conventional advanced air bearing (AAB) design 400. As such, FIG. 4 is an example embodiment of slider 110 in accordance with the invention. Actuator 204 has a front end 402 and a rear end 404. Front end 402 is adjacent movable air bearing surface element 206 and rear end 404 is adjacent leading edge end 203 of base 202. A first conductive surface 406 is disposed across front end 402 of actuator 204. A second conductive surface 408 is disposed across rear end 404 of actuator 204. Both first conductive surface 406 and second conductive surface 408 are elements of the electrical control circuit for actuator 204. A shield 410 is disposed from a portion of bottom 210 of base 202, across actuator 204, and a portion of movable air bearing surface element 206. Shield 410 is a metallic film which works to form an electrical shield to prevent "snap-over" between slider 110 and disc surface 107. As shown in FIG. 4, actuator 204 is hidden from view by shield 410.

The AAB feature at leading edge 203 accommodates a PZT thickness such that the overall length of the slider retains a standard or desired size. Both the PZT and movable air bearing surface element 206 are 125 μm thick in an example embodiment. Base 202, transducer 208, actuator 204 and movable air bearing surface element 206 are bonded together at the wafer section level with adhesive or using similar methods which are well known in the art. The section is then sliced into bars and lapped to the correct stripe height as is done in conventional slider machining processes. The AAB pattern is then fabricated on the composite bar and the bar is diced into sliders. FIG. 4 illustrates the basic layout for one embodiment of the present invention and shows how the new elements relate to other elements well known in the art.

Figure 5:
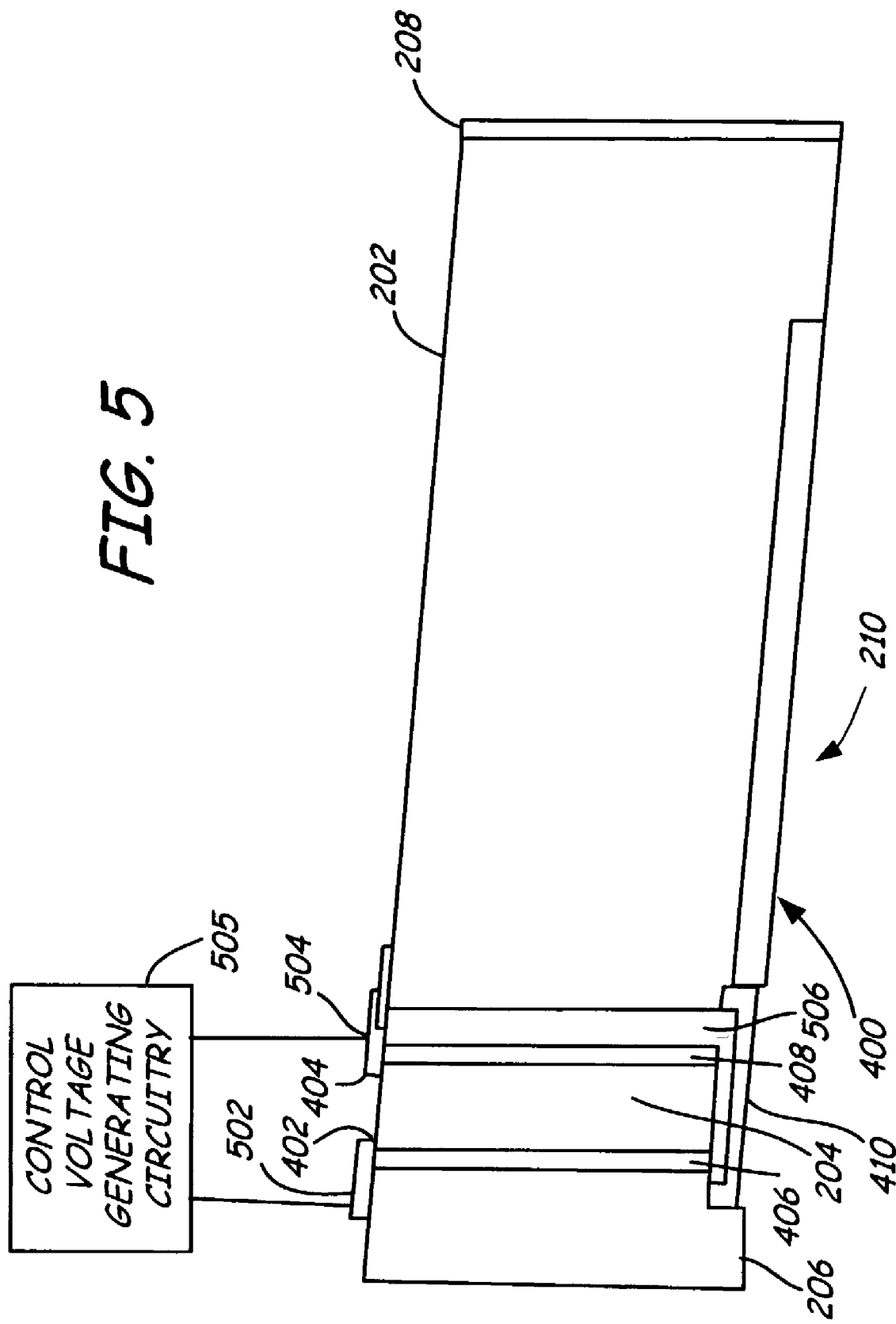
FIG. 5 is a side view of the detailed design structure of an apparatus embodying features of the present invention.
Figure 6:
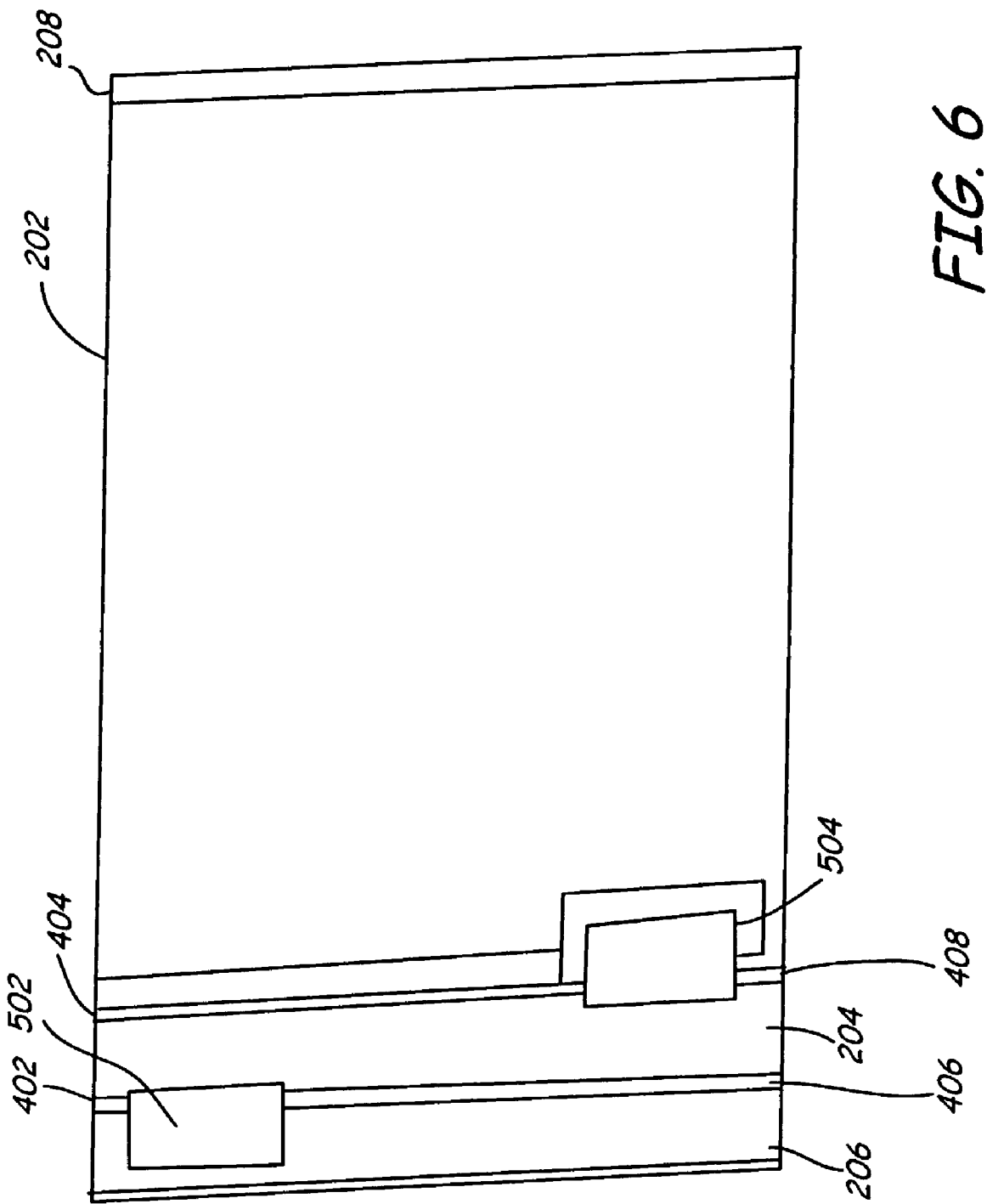
FIG. 6 is a top view of an apparatus embodying features of the present invention.

FIG. 5 is a side view, and FIG. 6 is a top view, of the apparatus shown in FIG. 4. FIGS. 5 and 6 both show base 202, actuator 204, movable air bearing surface element 206, and transducer or transducer layers 208. AAB 400 is also illustrated as a portion of the bottom of base 202. Also illustrated are a first contact 502 and a second contact 504. First contact 502 is electrically connected to first conductive surface 402 and second contact 504 is electrically connected to second conductive surface 404. A control voltage is applied across first contact 502 and second contact 504 to control the extent of movement by actuator 204. As shown diagrammatically in FIG. 5, the control voltage generated across contacts 502 and 504 is generated by circuitry 505, which can be included in servo electronics 128 (shown in FIG. 1) or elsewhere in the disc drive. This method for controlling a PZT sheet actuator is well known in the art. The control voltage determines how far actuator 204 moves movable air bearing surface element 206 relative to base 202. Shield insulator 506 is disposed between shield 410 and actuator 204, first conductive surface 402 and second conductive surface 404. Shield insulator 506 acts to electrically isolate shield 410 from voltages generated by circuitry 505. FIG. 5 and FIG. 6 provide views of a complete slider embodying the present invention and better illustrate how the control voltage reaches actuator 204.

Figure 7:
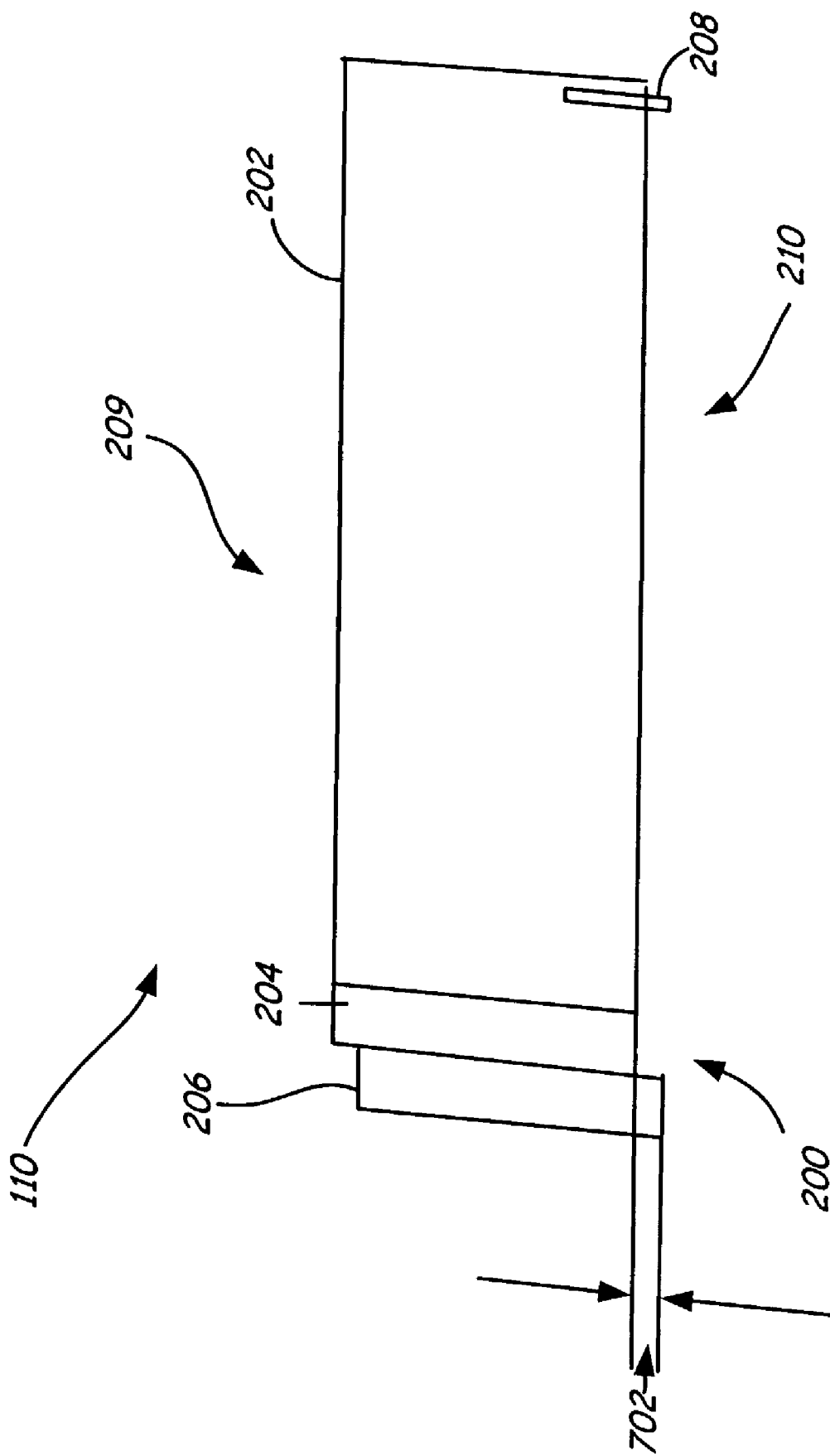
FIG. 7 is a side view of an apparatus embodying features of the present invention.

FIG. 7 is a side view of an apparatus embodying features of the present invention. Typically, the AAB design assumes that movable air bearing surface element 206 is level with base 202 when there is no voltage applied across actuator 204. Unfortunately, the machining process will inevitably introduce a physical discrepancy between movable air bearing surface element 206 feature and base 202. This discrepancy is called step height 702. In a disc drive application, a bias voltage is applied by circuitry 505 (shown in FIG. 5) to adjust movable air bearing surface element 206 to zero level position and control magnetic spacing around this zero position. FIG. 7 illustrates that embodiments of the present invention can still be used even if step height 702 is not zero. Consequently, the present invention is relatively easier to manufacture than previous designs because manufacturing tolerances for the step height are not as tight.

Figure 8:
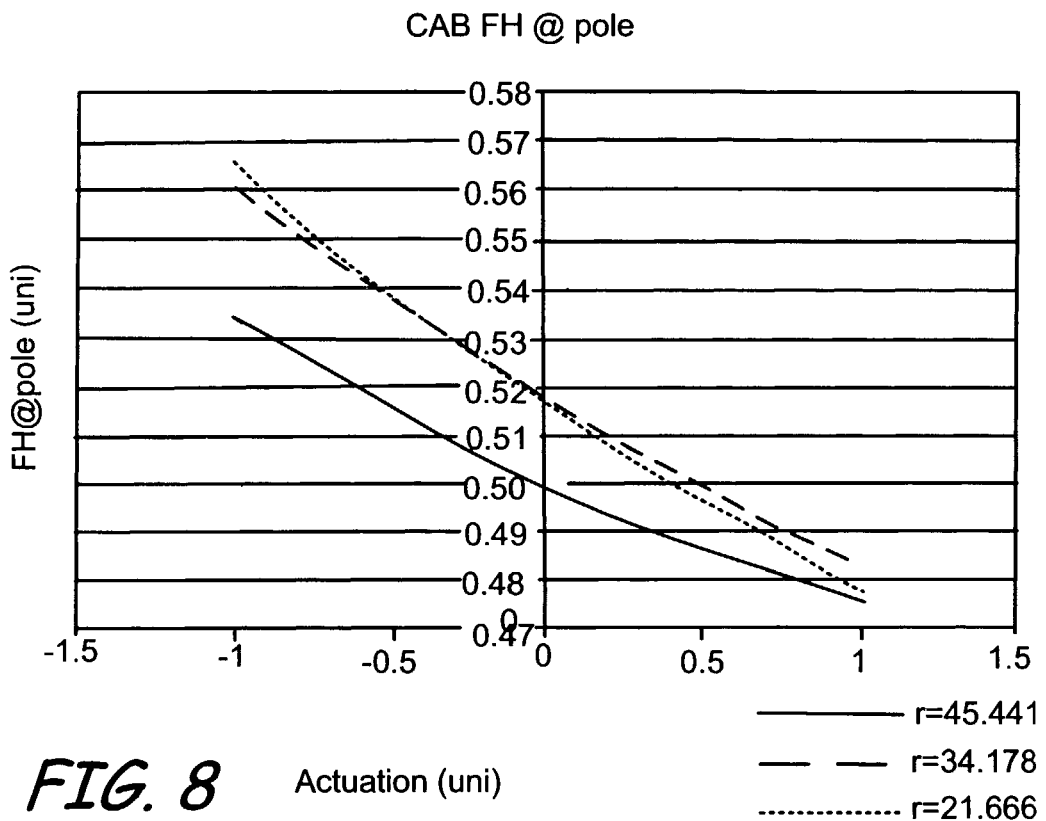
FIG. 8 is a graph of modeled results of actuation distance vs. fly height.
Figure 9:
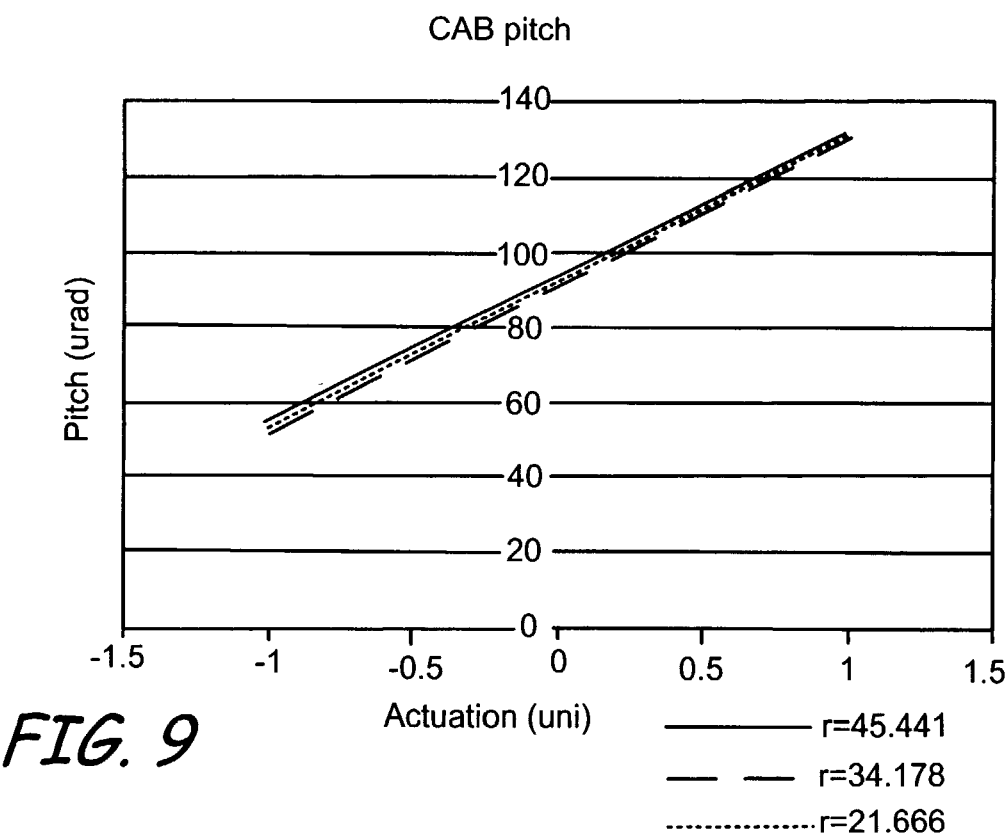
FIG. 9 is a graph of modeled results of actuation distance vs. pitch angle.

FIGS. 8 and 9 show the actuation characteristics of this design. FIG. 8 is a graph of modeled results of actuation distance vs. fly height. FIG. 9 is a graph of modeled results of actuation distance vs. pitch angle. Actuation distance of a PZT sheet as a function of control voltage is well known in the art. It is observed that pole tip magnetic spacing at the trailing edge end of the slider varies almost linearly with actuation distance of the movable element at the leading edge end of the slider. The magnetic spacing adjustment range for this design is +/−0.03 μin. in some embodiments. This adjustment range may be dependent on air bearing design. The adjustment range could be increased by changes to the air bearing design. FIG. 9 shows the linear relationship between pitch angle and the actuation distance. One consequence of these actuation characteristics is that both fly height and pitch angle change as actuation distance is controlled.

Figure 10:
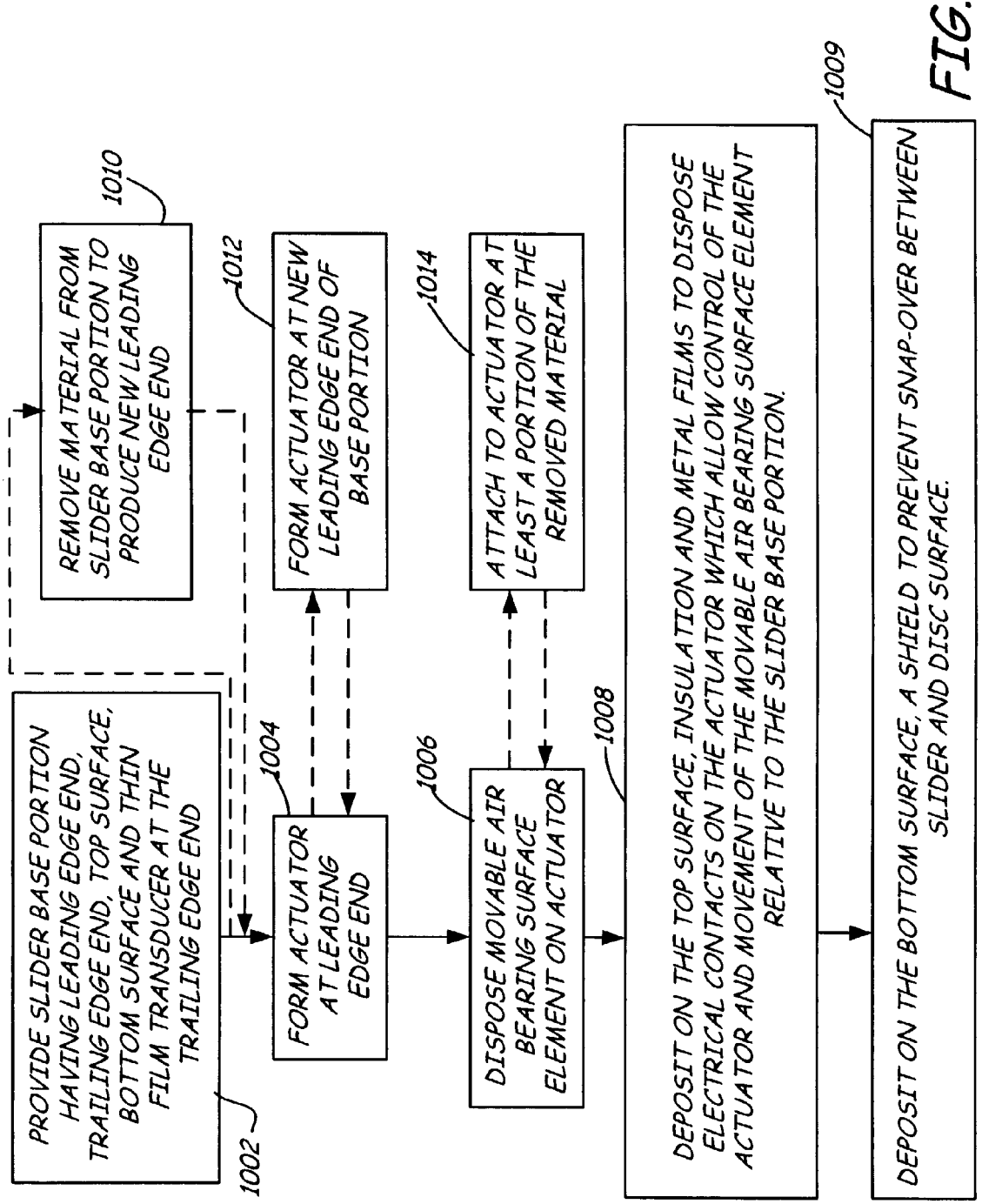
FIG. 10 is a block diagram illustrating an exemplary manufacturing process for a slider of the present invention.

FIG. 10 is a block diagram illustrating an exemplary manufacturing process for slider 110 of the present invention. Step 1002 of this exemplary method provides slider base portion 202 having leading edge end 203, trailing edge end 201, a top surface 209, and a bottom surface 210 and thin film transducer 208 at the trailing edge end 201. Step 1004 forms actuator 204 at leading edge end 203 and step 1006 disposes movable air bearing surface element 206 on actuator 204. Step 1008 deposits, on top surface 209, contact insulator and metal films to form electrical contacts 502 and 504, on actuator 204 which allow control of actuator 204 and movement of movable air bearing surface element 206 relative to slider base portion 202. Step 1009 deposits, on bottom surface 210, shield insulator 506 and metal films to form shield 410 to prevent snap-over between slider 110 and disc surface 111.

Some additional exemplary embodiments, illustrated with dashed lines, further include that, before steps 1004 and 1006, step 1010 removes material from slider base portion 202 to produce new leading edge end 203. Some exemplary embodiments include that as part of step 1004, step 1012 forms actuator 204 at new leading edge end 203 of base portion 202. An exemplary embodiment further includes that as part of step 1006, step 1014 attaches to actuator 204 at least a portion of the removed material.

The present invention can be described as follows with reference to the figures. In some embodiments of a slider (such as 110) for use in a data storage system, the slider (such as 110) comprises a base portion (such as 202) having a leading edge end (such as 203) and a trailing edge end (such as 201) and a movable air bearing surface element (such as 206) positioned at the leading edge end (such as 203) of the base portion. These embodiments also comprise an actuator (such as 204) positioned at the leading edge end (such as 203) of the base portion and coupling the base portion (such as 202) to the movable air bearing surface element (such as 206), the actuator (such as 204) selectively controllable to move the movable air bearing surface element (such as 206) relative to the base portion (such as 202) to alter an air bearing surface provided by the base portion (such as 202) and the movable air bearing surface element (such as 206) to thereby control a fly height of the slider (such as 110).

Some embodiments further include that the base portion (such as 202) also comprises a transducer (such as 208) on the trailing edge end (such as 201). Some embodiments further include that the base portion (such as 202) has a bottom surface. An embodiment further includes the bottom surface of the base portion (such as 202) provides a portion of the air bearing surface.

Some embodiments further include that the actuator (such as 204) is a PZT actuator. An embodiment further includes that the slider (such as 110) also comprises first (such as 502) and second contacts (such as 504) coupled respectively to first (such as 406) and second surfaces (such as 408) of the PZT actuator to selectively control the actuator (such as 204) to move the air bearing surface element relative (such as 206) to the base portion (such as 202). Some embodiments further include that the actuator (such as 204) is a MEMS actuator.

In some embodiments of a method for manufacturing a slider (such as 110) for use in a data storage system, the method comprises providing a slider (such as 110) base portion (such as 202) having a leading edge end (such as 203), a trailing edge end (such as 201) and a thin film transducer (such as 208) at the trailing edge end (such as 201), forming an actuator (such as 204) at the leading edge end (such as 203), disposing a movable air bearing surface element (such as 206) on the actuator (such as 204), depositing on the top surface, insulation and metal films to dispose electrical contacts (such as 502, 504) on the actuator (such as 204) which allow control of the actuator (such as 204) and movement of the movable air bearing surface element (such as 206) relative to the slider base portion (such as 202), and depositing on the bottom surface (such as 210), a shield insulator (such as 506) and metal films to dispose an electrical shield (such as 410) to prevent snap over between slider (such as 110) and disc surface (such as 111).

Some embodiments further include that, before forming the actuator (such as 204) at the leading edge end (such as 203) and disposing the movable air bearing surface element (such as 206) on the actuator (such as 204), the additional step of removing material from the slider base portion (such as 202) to produce a new leading edge end (such as 203). Some embodiments further include that forming the actuator (such as 204) at the leading edge end (such as 203) comprises forming the actuator (such as 204) at the new leading edge end (such as 203) of the base portion (such as 202). An embodiment further includes disposing the movable air bearing surface element (such as 206) on the actuator (such as 204) includes attaching to the actuator (such as 204) at least a portion of the removed material.

In some embodiments of a slider (such as 110) for use in a data storage system (such as 100), the slider (such as 110) comprises a base portion (such as 202) having a leading edge end (such as 203), a trailing edge end (such as 201), and an air bearing surface (such as 400) formed on a bottom surface (such as 210) extending therebetween; and means extending from the bottom surface (such as 210) for regulating airflow between the slider (such as 110) and a storage disc (such as 107) to adjust fly height of the slider (such as 110) during operation of the data storage system (such as 100).

Some embodiments further include that the means for regulating airflow includes an air flow regulation element (such as 206) positioned at the leading edge end (such as 203), and extendable toward the disc (such as 107) relative to the bottom (such as 210). Some embodiments further include that the means for regulating airflow further includes an actuator (such as 204) positioned at the leading edge end (such as 203) and coupling the air flow regulation element (such as 206) toward the disc (such as 107).

In some embodiments of a slider (such as 110) for use in a data storage system (such as 100), the slider (such as 110) comprises a base portion (such as 202) having a leading edge end (such as 203), a trailing edge end (such as 201), a bottom (such as 210) extending therebetween providing an air bearing surface (such as 400), and a data transducer (such as 208) positioned at the trailing edge end (such as 201); an air flow regulation element (such as 206) positioned at the leading edge end (such as 203) of the base portion (such as 202); and an actuator (such as 204) coupled to the base portion (such as 202) at the leading edge end (such as 203) and to the air flow regulation element (such as 206), the actuator (such as 204) selectively controllable to move the air flow regulation element (such as 206) relative to the bottom (such as 210) of the base portion (such as 202) to regulate air flow past the air bearing surface (such as 400) to thereby control a fly height of the slider (such as 110).

Some embodiments include that the actuator (such as 204) is a PZT actuator. Some embodiments further include that the slider (such as 110) further comprises first (such as 502) and second (such as 504) contacts coupled respectively to first (such as 406) and second (such as 408) surfaces of the PZT actuator to selectively control the actuator (such as 204) to move the air flow regulation element (such as 206) relative to the base portion (such as 202). Some embodiments include that the actuator (such as 204) is a MEMS actuator. Some embodiments include that the transducer (such as 208) is a magnetic transducer or an optical transducer.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the slider system while maintaining substantially the same functionality without departing from the scope and spirit of the present invention. In addition, although the disclosed embodiments described herein are directed to a slider system for a magnetic disc drive, it will be appreciated by those skilled in the art that the teachings of the present invention can be applied to an optical or other types of disc drives, without departing from the scope and spirit of the present invention. Thus, sliders 110 can be other than magnetic sliders. Therefore, references to magnetic spacing should be interpreted to include transducer to disc spacing in general.

What is claimed is:

1. A slider comprising:
   a base having a leading edge and a bottom surface;
   a movable surface element positioned at the leading edge of the base;
   a non-thermally responsive actuator positioned at the leading edge of the base and coupling the base to the movable surface element, wherein the actuator moves the moveable surface element in a substantially vertical direction relative to the bottom surface of the base;
   first and second contacts coupled respectively to first and second surfaces of the actuator to selectively control the actuator to move the movable surface element relative to the base; and
   insulation and metal films formed on a top surface of the base to dispose the first and second contacts on the actuator.

2. The slider of claim 1, wherein the actuator is selectively controllable to move the movable surface element relative to the bottom surface to alter an air bearing surface provided by the base.

3. The slider of claim 1, wherein the actuator is a PZT actuator.

4. The slider of claim 1, wherein the actuator is a MEMS actuator.

5. The slider of claim 1, and further comprising an insulator formed at the bottom surface of the base across the actuator and a shield formed at the bottom surface across the insulator, the insulator formed between the actuator and the shield.

6. A slider comprising:
   a base having a leading edge, a trailing edge, a bottom extending therebetween, and a data transducer positioned at the trailing edge;
   an air flow regulation element positioned at the leading edge of the base; and
   a non-thermally responsive actuator coupled to the base at the leading edge and to the air flow regulation element, the actuator selectively controllable to move the air flow regulation element at least approximately perpendicular to the bottom of the base to regulate air flow past the bottom; and
   an insulator formed at the bottom surface of the base across the actuator and a shield formed at the bottom surface across the insulator, the insulator formed between the actuator and the shield.

7. The slider of claim 6, wherein the actuator is a PZT actuator.

8. The slider of claim 7, and further comprising first and second contacts coupled respectively to first and second surfaces of the PZT actuator to selectively control the actuator to move the air flow regulation element relative to the base.

9. The slider of claim 6, wherein the actuator is a MEMS actuator.

10. The slider of claim 6, wherein the transducer is a magnetic transducer.

11. The slider of claim 1, wherein the moveable surface element is non-deformable when the non-thermally responsive actuator moves the moveable surface element in the substantially vertical direction.

12. The slider of claim 6, wherein the airflow regulation element is non-deformable when the non-thermally responsive actuator moves the airflow regulation element at least approximately perpendicular to the base.

13. A slider comprising:
   a base having a leading edge and a bottom surface;
   a movable surface element positioned at the leading edge of the base;
   a non-thermally responsive actuator positioned at the leading edge of the base and coupling the base to the movable surface element, wherein the actuator moves the moveable surface element in a substantially vertical direction relative to the bottom surface of the base; and
   an insulator formed at the bottom surface of the base across the actuator and a shield formed at the bottom surface across the insulator, the insulator formed between the actuator and the shield.

* * * * *